United States Patent [19]

Imai et al.

[11] Patent Number: 5,151,142
[45] Date of Patent: Sep. 29, 1992

[54] HEAVY DUTY PNEUMATIC RADIAL TIRES USING RUBBER REINFORCING FIBER CORDS WITH IMPROVED ADHESION

[75] Inventors: Isamu Imai, Tekorozawa; Toshihiro Yotsumoto, Tokyo; Norio Inada, Tokyo; Shigeyuki Toki, Tokyo; Maki Sato, Tokyo; Ichiro Wada, Tokyo, all of Japan

[73] Assignee: Bridgestone Corporation, Tokyo, Japan

[21] Appl. No.: 290,827

[22] Filed: Dec. 22, 1988

Related U.S. Application Data

[63] Continuation of Ser. No. 2,466, Jan. 12, 1987, abandoned.

[30] Foreign Application Priority Data

| Jan. 13, 1986 | [JP] | Japan | 61-3571 |
| Jan. 13, 1986 | [JP] | Japan | 61-3572 |
| Jan. 13, 1986 | [JP] | Japan | 61-5841 |
| Jan. 16, 1986 | [JP] | Japan | 61-7733 |
| Sep. 5, 1986 | [JP] | Japan | 61-209099 |

[51] Int. Cl.$^5$ .............................. B60C 9/13; B60C 1/00
[52] U.S. Cl. ..................................... 152/565; 152/527; 152/556; 152/451; 156/910
[58] Field of Search ............ 156/315, 330, 334, 335, 156/910, 331; 152/451, 527, 537, 548, 556, 560, 564, 565; 57/902; 427/386, 389.9; 428/378, 395, 295

[56] References Cited

U.S. PATENT DOCUMENTS

| 3,775,150 | 11/1973 | McClary | 156/910 X |
| 3,869,429 | 3/1975 | Blades | 264/184 X |
| 3,962,011 | 6/1976 | van Gils | 156/910 X |
| 3,977,172 | 8/1976 | Kerawalla | 57/902 X |
| 4,248,938 | 2/1981 | Takata et al. | 156/910 X |
| 4,285,756 | 8/1981 | Elmer | 156/910 X |
| 4,401,713 | 8/1983 | Takata | 428/395 X |
| 4,445,560 | 5/1984 | Musy | 152/527 X |
| 4,557,967 | 12/1985 | Willemsen et al. | 428/395 X |
| 4,572,863 | 2/1986 | Chung | 156/910 X |
| 4,680,228 | 7/1987 | Sharma | 156/330 X |
| 4,762,745 | 8/1988 | Mashimo et al. | 428/252 |

FOREIGN PATENT DOCUMENTS 50-94289 7/1975 Japan.

OTHER PUBLICATIONS

Solomon, T. S., "Systems for Tire Cord-Rubber Adhesion", Rubber Chem. & Techn., vol. 58, No. 3, Jul. 1985, pp. 561-576.

Primary Examiner—Caleb Weston
Assistant Examiner—Adrienne C. Johnstone
Attorney, Agent, or Firm—Sughrue, Mion, Zinn, Macpeak & Seas

[57] ABSTRACT

Rubber-reinforcing fiber cords are disclosed which are constituted by at least one kind of fibers selected from a group consisting of aromatic polyamide fibers, entire aromatic polyester fibers and polyvinylalcohol fibers having a tenacity of not less than 15 g/d. Spaces among filaments constituting the cord are each impregnated with a rubbery material. Radial tires are also disclosed which each comprise at least one pair of bead wires, at least one carcass ply cord layer and at least one belt ply cord layer. Carcass ply cords and/or belt ply cords are constituted by the above rubber-reinforcing fiber cords.

4 Claims, 3 Drawing Sheets

FIG.1
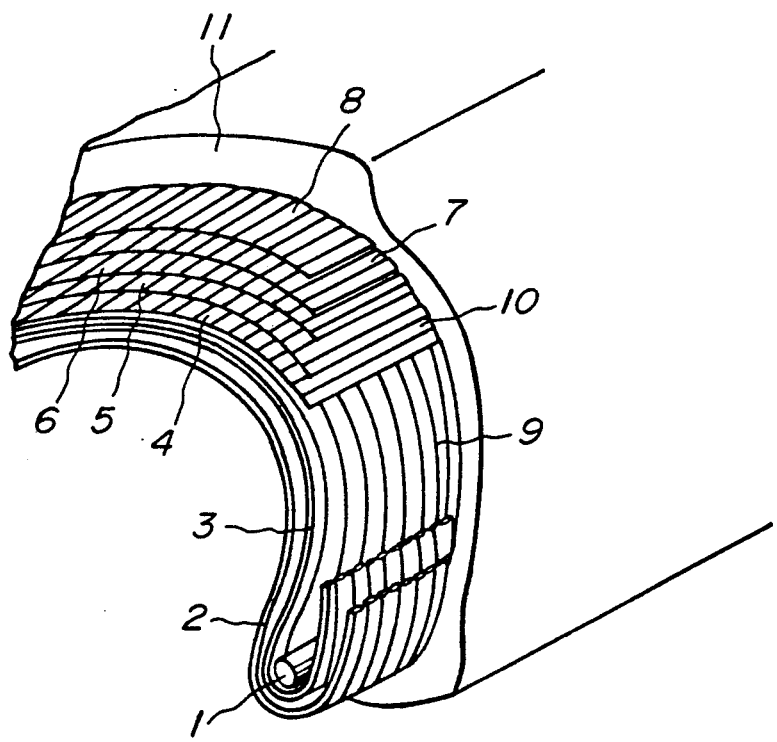
FIG.2
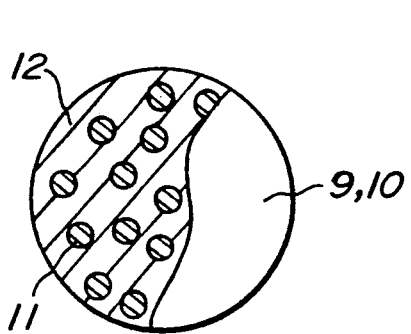
PRIOR ART FIG.3
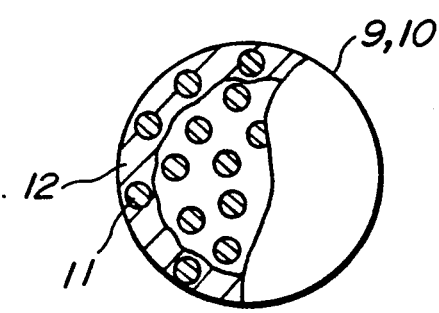

HEAVY DUTY PNEUMATIC RADIAL TIRES USING RUBBER REINFORCING FIBER CORDS WITH IMPROVED ADHESION

This is continuation of application Ser. No. 07/002,466 filed Jan. 12, 1987, now abandoned.

BACKGROND OF THE INVENTION

(1) Field of the Invention

The present invention relates to rubber-reinforcing fiber cords having improved fatigue resistance. More particularly, the invention provides a technique for improving the fatigue resistance of cords made of high elasticity fibers, which cords reinforce rubber articles.

Further, the present invention relates to heavy duty pneumatic radial tires. More particularly, the invention relates to improved durability performance of heavy duty pneumatic radial tires for use under high internal pressures at high speeds, such as radial tires for aircraft and radial tires for bullet trains.

(2) Related Art Statement

Recently, with high performances of automobiles and maintenance of roads, radial construction of tires has been progressively employed and a radial construction percentage for tires has been increasing. However, innovations of tire structures have been retarded with respect to aircraft tires and high speed train tires probably because the safety thereof must be taken into account, and such innovations have not been made much of up to date. But, while social demands for energy saving and demands for fuel consumption saving have been recently increasing, needs for weight reduction of these tires as constituent parts have also extremely become larger. Under the circumstances, radial tires have been investigated in which cords of aromatic polyamide fibers are used instead of steel cords as tire reinforcement. It is anticipated that a large extent of weight reduction can be done by using aromatic polyamide fibers having a high tenacity and a high modulus as cords in carcass plies.

However, the following problems occur if high tenacity and high modulus fibers such as aromatic polyamide fibers, entire aromatic polyester fibers or polyvinylalcohol fibers having a tenacity of not less than 15 g/d are used in carcass ply cords or belt ply cords.

A first problem is that since the high tenacity and high modulus fibers generally have dense and highly oriented molecular structures, they have poor adhesion to another member. When the high tenacity and high modulus fibers are used as reinforcing fibers, their surfaces are treated with adhesives in two baths. However, the adhesives do not enter the inside of the fibers. Thus,- the adhesion is almost zero particularly at end portions of carcass ply cords at which a carcass ply cord layer is turned up and fixed around a bead core or at ends of belt ply cords. Since a large strain occurs at end portions of the carcass ply cords and the belt ply cords particularly in the aircraft radial tires and the high speed train radial tires used under high pressures at high speeds, there is a problem that separation occurs during running and durability of the tires are extremely deteriorated.

A second problem is that the cords have poor fatigue durability. Since the molecules of the high tenacity and high modulus fibers are generally orientated in a certain direction to a high degree, intermolecular forces are weak. Thus, when the cores are repeatedly untwisted and re-twisted during the use, filaments constituting the cord rub to each other, with result that the surface layer of the filaments are worn out in a layer fashion and cut due to wearing which ultimately results in a failure of the tire.

The reason why such a phenomenon takes place will be explained in more detail with reference to FIGS. 4 and 5.

In the production of radial tires, carcass ply cord layers made of cords which are obtained by doubling and twisting aromatic polyamide fibers, entire aromatic polyester fibers and/or polyvinyl alcohol fibers having a tenacity of not less than 15 g/d together are cut in a desired size, and wound around a tire building drum 13 as a first carcass ply cord layer 2 and a second carcass ply cord layer 3, as shown in FIGS. 4 and 5. If necessary, the number of the carcass ply cord layers 2, 3 can be may be increased to three. Next, as shown in FIG. 6, bead wires 1 are bisymmetrically set at end portions of the first carcass ply cord layer 2 and the second ply cord layer 3, and then the carcass ply cord layers 2 and 3 are expanded. After that,the tire building drum 13 is removed. Then, as shown in FIG. 7, an interval between the right and left bead wires is narrowed, and the carcass ply cord layers 2 and 3 are further expanded to have a specified peripheral length. In this case, there is a likelihood that the length of the first carcass ply cord layer 2 between the right and left bead wires becomes shorter than that of the second carcass ply cord layer 3 between the bead wires and becomes shorter than as preliminarily set when it is cut. In the case of conventionally used organic fibers such as nylon, polyester, and rayon, the difference in length can be fully offset by thermal shrinkage during the vulcanization step and no problem occurs. In the case of the high tenacity and high elasticity fibers such as aromatic polyamide fibers, this difference in length remains at a place where a radius of curvature is the minimum in a radial section, ordinarily at a place from a shoulder portion to a side portion. At this place, the first carcass ply cord layer 2 is bent. In addition,the first carcass ply cords at this place are untwisted, so that the filaments of the cord at this place is extremely bent in a so-called folded phenomenon fashion to conspicuously deteriorate physical properties of the cords. Further, this folded phenomenon also occurs during running. Thus, the folded phenomenon occurring during the building of the tire further progresses during the tire running, so that filaments are cut and the tire is burst out at the worst case.

On the other hand, the belt ply cord layer needs not be turned up and fixed around the bead wires unlike in the carcass ply cord layer. Thus, the belt ply cord layer may be formed after the expansion of the carcass ply cord layers 2 and 3 as shown in FIG. 4. Even if a plurality of the belt ply cord layers are employed, they can be formed one by one. Therefore, a difference in length between the inner layer and the outer layer does not occur unlike in the carcass ply cord layers. However, in the case of the belt ply cords which are arranged in an angle of 0°-30° in the tire circumferential direction and are made of high tenacity and high elasticity fibers having almost no thermal shrinkage at a vulcanization temperature, such as aromatic polyamide fibers, the cords are bent due to unevenness at contact zones where the belt ply cords contact with the carcass ply cords, an inner liner, etc. Consequently, as in the case of the carcass ply cord layer, the filaments of the cords are cut, resulting in burst-out of the tire.

As mentioned in the above, the rubber-reinforcing fiber cords which are made of such conventional high tenacity and high elasticity fibers having a low elongation and useful as cords for reinforcing a variety of rubber articles such as tires, belts, hoses, rubber crawlers, etc. unfavorably have poor fatigue resistance, particularly poor compression fatigue resistance.

In order to solve the above problem, various techniques have heretofore been proposed. For instance, "Friends of Polymers" in pages 321 to 331, Jun., 1984 discloses that as the number of twist increases, the fatigue durable life is prolonged and paracrystal disturbance of crystals of fibers made of poly (p-phenyleneterephthalamide) containing piperazine or N,N'-bisaminobenzoylethyleneamine as a diamine component of the copolymer is increased so that a tenacity is the same level but the fatigue resistance is improved.

"Kautschuk+Gummi Kunststoffe", pp 379–384, vol 37, No. 5 (1984) describes that kink band formation and fretting among filaments of the cord are recognized as fatigue phenomena of the aramide fibers and use of preliminarily treated aramide fibers effectively prevents these fatigue phenomena. The reason is thought that a rubbery layer of a resorcinol-formaldehyde-latex adhesive (hereinafter referred to as "RFL adhesive") is formed among filaments of the thus preliminarily treated aramide fibers to lower local concentration of dynamic stress and to decrease direct friction among the filaments so that the fatigue durable life becomes longer.

However, the method of improving the fatigue resistance of the cords by the increased number of twist has a problem that when the number of twist is increased to improve the fatigue resistance, the tenacity and the elasticity tend to lower and therefore the characteristics of the high tenacity and high elasticity disappear.

Further, satisfactory results have not up to now been obtained by the method of bonding the cord and rubber with a tough adhesive at the interfaces to prevent frictional damages among the filaments of the cord or by a similar method in which an adhesive is applied to the cords through dipping to improve the adhesion between the cord and the rubber. On the other hand, when the fatigue resistance is improved by preliminarily treated yarns filaments having surfaces attached with a special lubricant to facilitate attachment of the adhesive during dipping or increase the adhesion, an excellent result can be obtained if a chemical structure of the filaments and a kind of the lubricant are appropriately selected. However, in this case, since the preliminary treatment is effected after spinning or drawing and thermal treatment of the fibers, it is difficult to uniformly attach the adhesive to the surfaces of the filaments in a yarn state. Thus, no effect can be expected.

When a third component is copolymerized with the fiber polymer to introduce flexible ether bonds into the chemical structure of the fiber polymer or conferring the flexibility upon the polymer through slight disturbance of the main chain arrangement, there occurs a problem that the tenacity, elasticity, thermal stability and chemical stability of the fibers are likely to be lowered.

According to another method, folding-kink band formation can be prevented by designing filaments in such a diameter that the filaments may not be folded due to a repetition stress under a fatigue condition that the repetition stress is constant. However, the condition of the constant repetition stress can not be realized in an environment in which tires, etc. are actually used. Thus, it can not be said that this method is effective.

SUMMARY OF THE INVENTION

It is an object of the present invention to provide a technique for improving the fatigue resistance of rubber-reinforcing fiber cords made of high elasticity fibers such as aromatic polyamide fibers, entire aromatic polyester fibers and/or polyvinyl alcohol fibers having a tenacity of not less than 15 g/d at a stage after the filaments of the fibers are processed to yarns, and particularly after a plurality of first twisted yarns are twisted together, without lowering the tenacity and elasticity of the cords.

It is an another object of the present invention to provide heavy duty pneumatic radial tires which solve the problems of the conventional radial tires using high tenacity and high modulus fibers as a reinforcement, and reduce the weight of the heavy duty pneumatic radial tires used under high internal pressures at high speeds, such as aircraft radial tires, and high speed train radial tires while improving the durability.

According to a first aspect of the present invention, there is provision of rubber-reinforcing fiber cords made of at least one kind of fibers selected from a group consisting of aromatic polyamide fibers, entire aromatic polyester fibers and polyvinyl alcohol fibers having a tenacity of not less than 15 g/d, wherein spaces among filaments constituting the cord are impregnated with a rubbery material.

According to a second aspect of present invention, there is a provision of rubber-reinforcing fiber cords made of at least one kind of fibers selected from a group consisting of aromatic polyamide fibers, entire aromatic polyester fibers and polyvinyl alcohol fibers having a tenacity of not less than 15 g/d, wherein spaces among filaments constituting said cord are impregnated with one selected from a group consisting of an aqueous solution, an aqueous dispersion and an organic solvent solution, said aqueous solution and said aqueous dispersion each comprising (a) a rubber latex, (b) at least one selected from an epoxy compound and a blocked isocyanate, and (c) at least one selected from a group consisting of a resorcinol-formaldehyde resin, a rubber vulcanizer and a rubber vulcanization accelerator at a mixing ratio among (a):(b):(c) being 100:1–30:1–30 by weight ratio, and said organic solvent solution comprising (d) at least one selected from a rubber polymer and a modified rubber polymer and (e) at least one selected from a group consisting of a resorcinol-formaldehyde resin, isocyanate, bismaleimidetriazine resin and epoxy compound at a mixing ratio of (d):(e) being 100:1–30 by weight ratio.

According to a third aspect of the present invention, there is a provision of rubber-reinforcing fiber cords made of at least one kind of fibers selected from a group consisting of aromatic polyamide fibers, entire aromatic polyester fibers and polyvinyl alcohol fibers having a tenacity of not less than 15 g/d, wherein said cord is treated in a low temperature plasma gas atmosphere under a reduced pressure at a stage of yarns giving rise to the cord, and a matrix in which filaments constituting the the cord are each buried in an impregnating agent mainly consisting of a rubbery material is formed.

According to a fourth aspect of the present invention, there is a provision of rubber-reinforcing fiber cords made of at least one kind of fibers selected from a group consisting of aromatic polyamide fibers, entire aromatic polyester fibers and polyvinyl alcohol fibers having a tenacity of not less than 15 g/d, wherein said rubber-reinforcing fiber cord is immersed into and impregnated with an impregnating agent comprising a liquid rubber having a number average molecular weight of 1,000 to 60,000 as an essential ingredient, and then subjected to bonding with an adhesive of a resorsinol-formaldehyde latex, followed by heating.

According to a fifth aspect of the present invention, there is a provision of a heavy duty pneumatic radial tire comprising at least a pair of bead wires on the right and the left, at least one carcass ply cord layer which is turned up and fixed around each of at least one pair of the bead wires and has cords arranged at an angle of 75° to 90° with respect to a tire circumferential direction, and at least one belt ply cord layer using cords arranged at an angle of 0° to 30° with respect to the tire circumferential direction, wherein the carcass ply cords and/or the belt ply cords are made of at least one kind of fibers selected from a group consisting of aromatic polyamide fibers, entire aromatic polyester fibers, and polyvinyl alcohol fibers having a tenacity of not less than 15 g/d, and spaces among filaments constituting each of the cords are impregnated with a rubbery material.

According to a sixth aspect of the present invention, there is a provision of a heavy duty pneumatic radial tire comprising at least a pair of bead wires on the right and the left, at least one carcass ply cord layer which is turned up and fixed around each of at least one pair of the bead wires and has cords arranged at an angle of 75° to 90° with respect to a tire circumferential direction, and at least one belt ply cord layer using cords arranged at an angle of 0° to 30° with respect to the tire circumferential direction, wherein the carcass ply cords and/or the belt ply cords are made of at least one kind of fibers selected from a group consisting of aromatic polyamide fibers, entire aromatic polyester fibers, and polyvinyl alcohol fibers having a tenacity of not less than 15 g/d, and spaces among filaments constituting each of the cord are impregnated with one selected from a group consisting of an aqueous solution, and aqueous dispersion and an organic solvent solution, said aqueous solution and said aqueous dispersion each comprising (a) a rubber latex, (b) at least one selected from a group consisting of an epoxy compound and a blocked isocyanate, and (c) a resorcinol-formaldehyde resin, a rubber vulcanizer and a rubber vulcanization accelerator at a mixing ratio of (a):(b):(c) being 100:1–30:1–30 by a weight ratio, and said organic solvent solution comprising (d) at least one selected from a group consisting of a rubber polymer and a modified rubber polymer and (e) a resorcinol-formaldehyde resin, an isocyanate, a bismaleimidetriazine resin and an epoxy compound at a mixing ratio of (d):(e) being 100:1–30 by weight ratio.

According to a seventh aspect of the present invention, there is a provision of a heavy duty pneumatic radial tire comprising at least one pair of bead wires on the right and left, at least one carcass ply cord layer which is turned up and fixed around each of said at least one pair of the bead wires and has cords arranged at an angle of 75° to 90° with respect to a tire circumferential direction, and at least one belt cord layer having cords arranged at an angle of 0° to 30° with respect to the tire circumferential direction, wherein twisted cords constituting the carcass ply cord layer and/or twisted cords constituting the belt ply cord layer are made of at least one kind of fibers selected from a group consisting of aromatic polyamide fibers, entire aromatic polyester fibers and polyvinyl alcohol fibers having a tenacity of not less than 15 g/d, the cords are treated in a low temperature plasma gas atmosphere under a reduced pressure at a stage of yarns; and a matrix formed in such a manner that filaments of each of the cords are buried in an impregnating agent mainly consisting of a rubbery material.

According to a eighth aspect of the present invention, there is a provision of a heavy duty pneumatic radial tire comprising at least one pair of bead wires on the right and the left, at least one carcass ply cord layer which is turned up and fixed around each of at least one of the bead wires and has cords arranged at an angle of 75° to 90° with respect to a tire circumferential direction, and at least one belt ply cord layer having cords arranged at an angle of 0° to 30° with respect to the tire circumferential direction, wherein at least twisted cords constituting the carcass ply cord layer and/or twisted cords constituting the belt ply cord layer are each formed by twisting together a plurality of yarns made of at least one kind of fibers selected from a group consisting of aromatic polyamide fibers, entire aromatic polyester fibers and polyvinyl alcohol fibers having a tenacity of not less than 15 g/d or a plurality of said yarns as first twisted to form a cord; and immersing the resulting cord into an impregnating agent comprising a liquid rubber having a number average molecular weight of 1,000 to 60,000 as an essential component and then bonding the cord with an adhesive of a resorcinol-formaldehydelatex under heating.

These and other objects, features, and advantages of the invention will be well appreciated upon reading of the invention when taken in conjunction with the attached drawings with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a perspective view of a partially cut-away heavy duty pneumatic radial tire according to the present invention for illustrating an inner construction thereof;

FIG. 2 is a sectional view of rubber-reinforcing fiber cord according to the present invention;

FIG. 3 is a sectional view of a rubber-reinforcing fiber cord used in conventional radial tires;

DETAILED DESCRIPTION OF THE INVENTION

Figure 4:
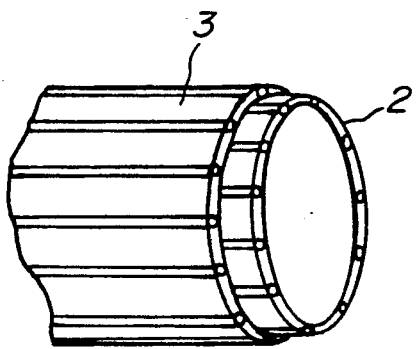
FIGS. 4 through 7 are views of illustrating steps for building a radial tire.
Figure 5:
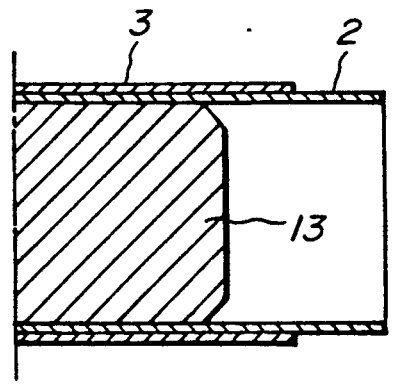
Figure 6:
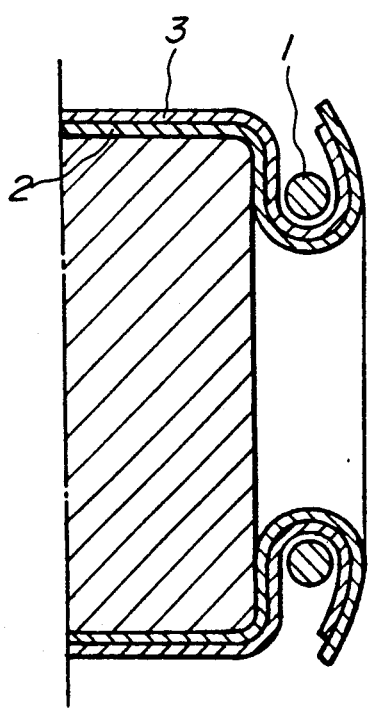
Figure 7:
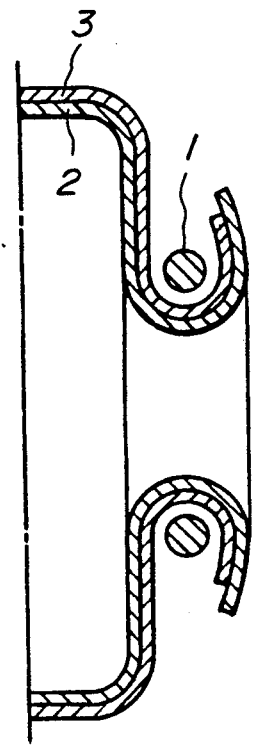

The present invention relates to rubber-reinforcing fiber cords made of at least one kind of fibers selected from a group consisting of aromatic polyamide fibers, entire aromatic polyester fibers, and polyvinyl alcohol fibers having a tenacity of not less than 15 g/d, wherein spaces among filaments constituting the cords are impregnated with a rubbery material. It is preferable that impregnation is effected such that a porosity among the filaments is not less than 50% when a cross section of the cord impregnated with the rubbery material is observed by a microscope. In order to obtain a cord of such a structure, the rubber material may be used as it is, or in an aqueous solution (or an aqueous dispersion) or in an organic solvent solution, and is applied together with a spinning lubricant during a step of spinning fiber filaments constituting the cord or applied before the cord is formed by twisting subsequent to the spinning and drawing. It may be that a cord-like product twisted is immersed into the above solution (or dispersion) to sufficiently impregnate the rubbery material into the inside of the cord. Although the carcass ply cord and the belt ply cords undergoes bonding treatment with a rubbery material in the case of the conventional radial tires, the rubbery material is applied after the cord is formed by twisting the fibers. Thus, the rubbery material does not enter inside the cords. As shown in FIG. 3, the rubbery material is present only at a surface portion of the cord 9 (10), and does not completely impregnate the spaces among the filaments 11.

As a rubbery material used in a water-dispersion system, a rubbery material mainly consisting of a latex may be recited. An epoxy compound, a blocked isocyanate, a resorcinol-formaldehyde resin, a rubber vulcanizer, a rubber vulcanization accelerator, etc. may be added thereto, if necessary. As a rubbery material used in an organic solvent system, a rubbery material mainly consisting of a rubber polymer or a modified rubber polymer may be recited. An isocyanate, resorcinol-formaldehyde resin, phenol-modified resin, a bismaleimide triazine resin may be added thereto, if necessary. As an organic solvent, use may be made of trichloroethane, toluene, etc. It is desirable that the concentration of the aqueous solution (the aqueous dispersion) or the organic solvent solution is 1-30% by weight. If the concentration is too low, it becomes difficult to uniformly fill the rubbery material among the fiber filaments. To the contrary, if the concentration is too high, it becomes difficult to twist the reacted fiber filaments. Further, when the twisted cord is impregnated, it is difficult to impregnate the rubbery material into the inside of the cord.

As the latex used in the present invention, mention may be made of an aqueous dispersion type rubbery latex of a rubbery polymer, for instance, natural rubber latex, styrene-butadiene copolymer latex, vinylpyridine-styrene-butadiene terpolymer latex, carboxyl group-containing styrene-butadiene copolymer latex, acrylonitrile-butadiene latex, polychloroprene latex, polybutadiene latex, etc.

As an epoxy compound, use may be made of reaction products between an aliphatic polyalcohol such as glycerine, propyrene glycol, ethylene glycol, hexane triol, sorbitol, trimethylol propane, 3-methylpentanetriol, polyethylene glycol, polypropyrene glycol etc. and a halohydrine such as epichlorohydrin, reaction products between an aromatic polyalcohol such as resorcine, phenol, hydroquinoline, phlorogulcine bis(4-hydroxyphenyl)methane and a halohydrin, reaction products between a novolak type phenolic resin such as a novolak type phenolic resin, or a novolak type resorcinol resin and halohydrin.

As a blocked isocyanate, use may be made of reaction products between one or more isocyanates and one or more kinds of isocyanate blocking agents. The isocyanates include monoisocyanates such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocyante, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propyrene diisocyanate, cyclohexylene-1,2-diisocyanate, diphenylene diisocyanate, butylene-1,2-diisocyanate, diphenylmethane-4,4diisocyanate, diphenylethane diisocyanate, 1,5-naphthalene diisocyanate, etc., and triisocyanates such as triphenylmethane triisocyanate, diphenylmethane triisocyanate, etc. The isocyanate-blocking agents include phenols such as phenol, cresol, and resorcinol, tertiary alcohols such as t-butanol and t-pentanol, aromatic amines such as diphenylamine, diphenylnaphthylamine and xylidine, ethyleneimines such as ethylene imine and propyleneimine, imides such as succinic acid imide, and phthalimide, lactams such as $\epsilon$-caprolactam, $\delta$-valerolactam, and butylolactam, ureas such as urea and diethylene urea, oximes such as acetoxime, cyclohexanoxime, benzophenon oxime, and $\alpha$-pyrolidon.

As the resorcinol-formaldehyde resin, use may be made or resorcinol-formaldehyde resins in which one mole of resorcinol is reacted with 0.4 to 3.0 moles of formaldehyde in the presence of an alkaline catalyst such as caustic soda, ammonia, and urea and the connection number of resorcinol molecules which are bridged by formaldehyde molecules is not less than 3.

Further, as the rubber vulcanizer, use may be made of sulfur, p-benzoquinone dioxime, p,p-dibenzoylquinone dioxime, 4,4-dithio-bis-dimorpholine, tetrachlorobenzoquinone, trimethylolpropane trimethacrylate, ammonium benzoate, N,N'-m-phenylene dimaleimide, 1,1-di-t-butylperoxy-3,3,5-trimethylcyclohexane, di-t-butylperoxide, t-butylcumylperoxide, 2,5-dimethyl-2,5-di(t-butylperoxy)hexane, 1,3-bis-(t-butylperoxyisopropyl) benzene, 4-butylperoxy-isopropylcarbonate.

As the vulcanization accelerator, use may be made of aldehyde ammonia represented by hexamethylenetetramine, guanidines such as diphenylguanidine, di-o-triguanidine and o-tolyl-biguanidien, thioureas, thiazoles, dithiocarbamate, xanthate, thiuam, and vulcanization accelerators used in rubbers. The thioureas include thiocarbanilide, N,N'-diethylthiourea, dibutylthiourea, dilaurylthiourea, 2-mercaptoimidazoline, trimethylthiourea, etc. The thiazoles include merchaptobenzothiazole, N-t-butyl -2-benzothiazolesulphenamide, N,N'-dicyclohexyl -2-benzothiazole sulfenamide, benzothiazyl sulfide, mercaptobenzothiazole Na, mercaptobenzothiazole Zn, 2(4-morpholinodithio)benzothiazol, 2-(2,4-dinitrophenyl)mercarptobenzothiazole, N,N'-diethylthiocarbamoyl -2-benzothiazoyl sulfide, N-cyclohexyl -2-benzothiazyl-sulfenamide, N-oxydiethylene -2-benzothiazole sulfenamide, etc. The dithiocarbamates include Fe dimethyldithiocarbamate, Zn dimethyldithiocarbamate, Zn diethyldithiocarbamate, Zn di-n-butyldithiocarbamate, Zn ethylphenyldithiocarbamate, ZnN-pentamethylenedicarbamate, Zn dibenzyldithiocarbamate, Na dimethyldithiocarbamate, Na diethyldithiocarbamate, Na dibutyldithiocarbamate, Cu dimethyldithio carbamate, etc. The xanthates include Zn butyl xanthate, Na isopropyl xanthate, Zn isopropyl xanthate, etc. The thiurams include tetramethylthiuram disulfide, tetramethylthiuram disulfide, tetrabuthylthiuram disulfide, etc.

Among the above ingredients, those insoluble in water are dispersed in water by using appropriate surface active agents according to an ordinary wet type dispersion method.

A mixing ratio among a rubber latex; an epoxy compound and a blocked isocyanate; and resorcinol-formaldehyde resin, rubber vulcanizer and rubber vulcanization accelerator is preferably 100:1–30:1–30 by weight ratio. If the ratio of the rubber latex is lower and those of the other ingredients increases, the flexibility of the rubbery material decreases. Thus, it becomes difficult to attain the object of the present invention.

On the other hand, as the rubber polymer used in the organic solvent system in the present intention, mention may be made of styrene-butadiene rubber, polybutadiene rubber, polyisoprene rubber, acrylonitrile-butadiene rubber, chloroprene rubber, ethylene-propyrene rubber, ethylenepropyrene-diene terpolymer, butyl rubber, acryl rubber, urethane rubber, and natural rubber. As the modified rubber, mention may be made of the above-mentioned rubber polymers modified with epoxy, chlorinated, or modified with acrylic acid.

To these rubber polymers or the modified rubber polymers may be compounded and kneaded carbon black, a vulcanizer, a vulcanization accelerator, etc.

As the isocyanate, use may be preferably made of monoisocyanates, diisocyanates, and triisocyanates. The monoisocyanates include phenylisocyanate, dichlorophenylisocyanate, and naphthalene monoisocyanate. The diisocyanates include tolylene diisocyanate, dianisidine diisocyanate, hexamethylene diisocyanate, m-phenylene diisocyanate, tetramethylene diisocyanate, alkylbenzene diisocyanate, m-xylene diisocyanate, cyclohexylmethane diisocyanate, 3,3-dimethoxydipheylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4'-diisocyanate, diphenylethane diisocyanate, 1,5-naphthalene diisocyanate, etc. The triisocyanatges include triphenylmethane triioscyanate, diphenylmethane triisocyanate.

The bismaleimide triazine resin means a polyimide resin which mainly consists of two ingredients of a bismaleimide and a triazine and has imide groups in the molecules.

A mixing ratio of isocyanate, resorcinol-formaldehyde resin and bismaleimide triazine resin to the rubber polymer or the modified rubber polymer is preferably in a range of 100:1–30 by weight ratio. If the ratio of the rubber polymer or the modified rubber polymer is lowered and the mixing ratio of the above mixing polymer ingredients increases, the flexibility of the rubbery materials lowers. Thus, it becomes difficult to attain the object of the present invention.

The aromatic polyamide fiber is constituted by a polymer of the following general formula:

$$-\!\!\!\left(\!\text{NH}\!-\!\text{Ar}_1\!-\!\text{NH}\!-\!\underset{\underset{O}{\|}}{C}\!-\!\text{Ar}_2\!-\!\underset{\underset{O}{\|}}{C}\right)_{\!\!\overline{n}}$$

in which $Ar_1$ and $Ar_2$ denote 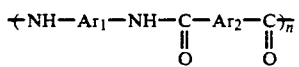,

 and n is an integer).

The entire aromatic polyester fiber is a copolymerization polyester having monomer units:

$$-\underset{\underset{O}{\|}}{C}\!-\!\text{Ar}_3\!-\!\underset{\underset{O}{\|}}{C}-.$$

and monomer units of —O—Ar$_4$—O—. Further, the copolymerization polyester fiber may contain monomer units of $$-\text{O}\!-\!\text{Ar}_3\!-\!\underset{\underset{O}{\|}}{C}-.$$

In the above, $Ar_3$ denotes

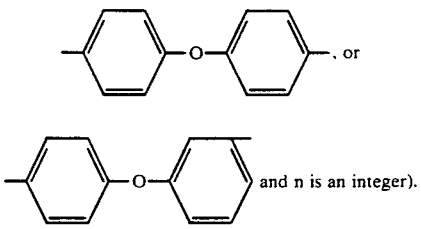

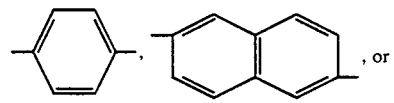 and $Ar_4$ does 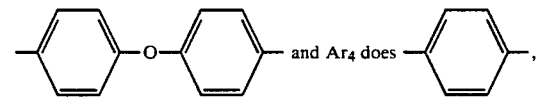,

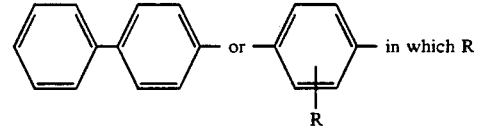 in which R denotes 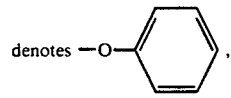, an alkyl group, or a halogen atom.

Since the polyvinylalcohol fiber having a tenacity of not less than 15 g/d is a strongly oriented fiber having a high tenacity and a high elasticity, it is suitable as reinforcing cords for heavy duty pneumatic radial tires. However, the polyvinylalcohol fiber has defect that it is poor in bending fatigue resistance as in the case of the aromatic polyamide fiber and the entire aromatic polyester fiber. The rubber-reinforcing cord according to the present invention is constituted by at least one kind of fibers selected from a group consisting of an aromatic polyamide fibers, the entire aromatic polyester fibers and polyvinyl alcohol fibers having a tenacity of not less than 15 g/d, and is impregnated with a rubbery material by impregnating spaces among the fibers with an aqueous solution or an aqueous dispersion or an organic solvent solution. The aqueous solution and the aqueous dispersion each contain (a) rubber latex, (b) at least one selected from an epoxy compound and a blocked isocyanate, and (c) at least one selected from a group consisting of resorcinol-formaldehyde resin, a rubber vulcanizer and a rubber vulcanization accelerator at a mixing ratio of (a):(b):(c) being 100:1-30:1-30 by weight ratio. The organic solvent solution contains (d) at least one kind selected from rubber polymer and modified rubber polymer, and (e) at least one kind selected from a group consisting of resorcinol-formaldehyde resin, an isocyanate, a bismaleimidetriazine resin and an epoxy compound at a mixing ratio of (d):(e) being 100:1-30 by weight ratio.

In the case of the aqueous solution or the aqueous dispersion, water-insoluble ingredients among the above-mentioned ones are dispersed in water by using an appropriate surface active agent according to an ordinary wet type dispersion method.

The mixing ratio among (a) the rubber latex, (b) the epoxy compound and/or the blocked isocyanate and (c) the resorcinol-formaldehyde resin, the rubber vulcanizer and/or the rubber vulcanization accelerator is preferably in a range of 100:1-30:1-30 by weight ratio. If the ratio of the rubber latex is lower and the ratio of the other ingredients increases, the flexibility of the impregnated cord lowers. Thus, it becomes difficult to attain the object of the present invention.

On the other hand, the impregnating agent used in the organic solvent system contains (d) the rubber polymer and/or the modified rubber polymer, and (e) at least one selected from the group consisting of resorcinol-formaldehyde resin, isocyanate, bismaleimidetriazine resin and epoxy compound.

According to another aspect of the present invention, it is further preferable to use the rubber-reinforcing cord in which is formed a matrix having the filaments of the aromatic polyamide fibers, the entire aromatic polyester fibers and/or the polyvinylalcohol fibers having a tenacity of not less than 15 g/d independently buried into an impregnating agent and the impregnating agent maintains its flexibility before the vulcanization of a tire and is resinified during the vulcanization.

Because the impregnating agent maintains the flexibility, when the twisted cord treated with the impregnating agent is boiled in an organic solvent such as trichloroethane or toluene, the impregnating agent dissolves and the filament bundle is broken. The resinifying means that even when the twisted cord is boiled like this, the impregnating agent does not dissolve and the filament bundle is no longer broken.

The rubber-reinforcing fiber cords as these preferred embodiments will be produced as follows:

The above-mentioned impregnating agent is applied together with the application of the spinning lubricant after the spinning and the drawing of the above fiber material or after the application of the spinning lubricant, the impregnating agent is applied before twisting. Alternatively, the twisted fiber material in a cord-like state is immersed into the impregnating agent.

In order to make the impregnating agent maintain the flexibility before the vulcanization of the tire, there is available a method in which water or solvent is removed while a drying temperature is suppressed to low temperatures and a drying time period is adjusted after the application of the impregnating agent. The amount of the applied impregnating agent can be controlled by adjusting the concentration thereof. As a matter of course, the flexibility can be maintained by variously varying the quantitative ratios of the ingredients.

Further, according to the rubber-reinforcing fiber cord of the present invention, it is preferable to impregnate the cord constituted by twisting together a plurality of yarns or first twisted yarns with an impregnating agent mainly consisting of a liquid rubber having a number average molecular weight of 1,000 to 60,000 in GPC method as an essential ingredient and then bonded with an RFL adhesive under heating, since the fatigue resistance is extremely improved. The immersion and impregnation treatment may be followed by the drying or may be followed by bonding and heating without being accompanied by the drying step.

In the present invention, polybutadiene rubber, polyisoprene rubber, styrene-butadiene rubber, acrylonitrilebutadiene rubber may be used as the liquid rubber. The liquid rubber is not limited to any specific ones so long as the liquid rubber does not interrupt the adhesion between the rubber-reinforcing cord and the rubber composition or the RFL adhesive contacting therewith. Further, in order to improve the adhesion and mechanical strength, it is preferable that the terminals of the molecular chains of the polymers of the liquid rubber or the inside of the molecular chains have activating functional groups such as carboxyl groups, epoxy groups, acrylonitrile groups, isocyanate groups, etc. The liquid rubber is preferably a polybutadiene polymer having hydroxyl groups at terminals of molecular chains or a polyisoprene polymer having carboxyl groups at terminals of molecular chains.

A liquid rubber having the epoxy groups in molecules is more preferable because it has high affinity with the fibers.

In order to prevent reduction in the impregnation power due to increased viscosity upon reaction when the cord is being impregnated with the impregnating agent, the activating functional groups may be blocked so that they may not exhibit their activity at temperatures lower than a set temperature.

In order to increase the attached amount of the impregnating agent upon the polymer and improve the adhesion of the filaments with the impregnating agent, the number average molecular weight of the liquid rubber use in the present invention is required to be not more than 60,000. If over 60,000, sufficient impregnation cannot be assured even by lowering the viscosity of the liquid rubber and improving the impregnating power of the impregnating agent under heating at high temperatures, when no solvent is used. Further, when a solvent is used, an amount of the solvent in the impregnating agent must be increased. In this case, since an attached amount of the polymer in the liquid rubber to the filaments is decreased, satisfactory lubricating action is unlikely to be obtained. In order to assure the fatigue resistance and the adhesion, the lower upper limit of the number average molecular weight of the liquid rubber is preferably not less than 1,000.

In order to increase the attached amount of the polymer of the liquid rubber, it is preferable that no solvent is used, and liquid rubber polymer is impregnated while its viscosity is lowered by heating. In order to improve the impregnating power, the liquid rubber in the impregnating agent is diluted with a solvent.

The applied amount of the polymer of the liquid rubber of the impregnating agent to the cord is preferably in a range of 5-30% by weight. The reason is that if it is less than 5% by weight, lubrication efficiency is poorer and the fatigue resistance is not so improved, while if it exceeds 30% by weight, a thick layer of the adhesive is formed on the surface of the cord to lower the adhesion.

Next, a method of impregnating spaces among filaments of the cords with the impregnating agent will be explained as follows:

As a first method, the cord is immersed into the impregnating agent, and left as it is for a long time period.

As a second method, the cord immersed with the impregnating agent is placed in vacuum or pressurized conditions or treating conditions thereof are repeated to promote the impregnation.

Figure 8:
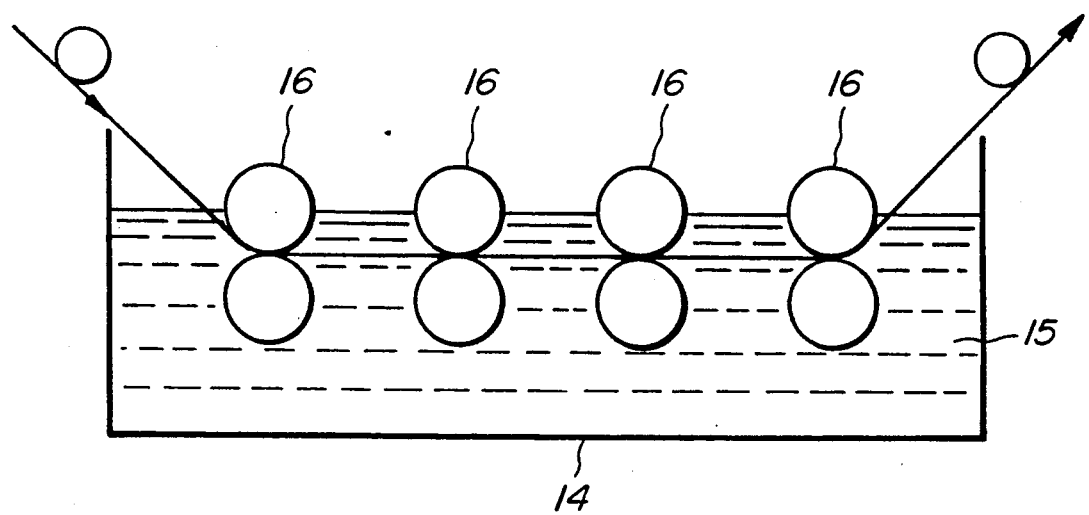
FIG. 8 is a sectional view of a vessel for impregnating a rubber-reinforcing fiber cord with an impregnating agent.

As a third method, as shown in FIG. 8, the cord is passed through a plurality of squeezing rolls 16 placed in a vessel 14 containing the impregnating agent 15. According to this method, deaeration is effected while the cord is pressed between the squeezing rolls. The cord having passed through the squeezing rolls is slightly swelled to suck the impregnating agent. The impregnation is promoted by repeating the above procedure.

According to the rubber-reinforcing fiber cords of the present invention, when the cord is impregnated with the impregnating agent containing the liquid rubber having the number average molecular weight of not more than about 60,000 in GPC method as an essential ingredient, the impregnating agent is attached among the filaments and the yarn bundles in the cord. Accordingly, even when the cord deforms upon receipt of an external force, the impregnating agent exhibits lubricating action among the filaments and the yarn bundles. Therefore, since damage at rubbing portions is reduced and the cord is softened due to the lubricating action. Thus, the local deformation of the cord is decreased and the heat generation is reduced. By so doing, the fatigue resistance of the cord is improved.

When the rubber-reinforcing fiber cord according to the present invention is intended to be produced, it is more preferable that the yarns of the aromatic polyamide fibers, the entire aromatic polyester fibers or the polyvinyl alcohol fibers having a tenacity of not less than 15 g/d are treated with a low temperature plasma gas atmosphere under a reduced pressure and each of filaments is buried into the impregnating agent mainly consisting of a rubbery component to form the matrix.

As the low temperature plasma gas used in the low temperature plasma treatment of the yarns constituted by the above material, use may be made of non-polymerizable gas, a polymerizable gas, or a heating evaporation gas, singly or in mixture thereof. For instance, helium, hydrogen, argon, oxygen, nitrogen, air, chlorine, ammonia, carbon monoxide, carbon dioxide, sulfur dioxide, nitrogen monoxide, formaldehyde, hydrogen chloride, or material vaporizable under a reduced pressure, such as carbon tetrachloride, halogenated hydrocarbon (trichlene, etc.), formaldehyde water, water, methylamine, ammonia water, steam, etc. are preferably introduced, and the low temperature plasma is generated at an output of 1 W to 10 kW by means of an audiowave, high frequency wave or microwave generator after a reduced pressure zone is adjusted to $10^{-1}$ to 10 Torr. The SurfaCe treatment is effected under irradiation in this atmosphere for 1 to $10^3$ seconds. This low temperature plasma treatment may be effected after the spinning and drawing or before the twisting subsequent to the application of the spinning lubricant. What is important is that the plasma treatment is effected before the treatment with the impregnating agent.

As the impregnating agent used in the formation of the matrix by enclosing each of the filaments, use may be made of the above-mentioned various rubbery materials.

In order to impregnate the rubbery material into the fiber cord after the low temperature plasma treatment of the yarns of the above-mentioned fibers, there is available a method in which the rubbery material is applied simultaneously with the application of the spinning lubricant subsequent to the spinning and drawing of the above fiber material used in the present invention or before the twisting subsequent to the application of the lubricant, or the twisted cord-like fiber material is immersed into the impregnating agent.

As mentioned above, when use is made of the cord composite body which is made of the material selected from the aromatic polyamide fibers, the entire aromatic polyester fibers, and the polyvinyl alcohol fibers having a tenacity of not less than 15 g/d and is treated in the low temperature plasma gas atmosphere under a reduced pressure in a yarn stage while a matrix is formed in which each of the filaments is buried in the impregnating agent mainly consisting of the rubbery material, hydrophilic groups are given to the surfaces of the fiber filaments of the cord composite body through the low temperature plasma treatment or the wettability between the filaments and the impregnating agent is conspicuously improved due to the spattering effect. Thereby, the impregnating agent is uniformly attached and more firmly bonded to the filaments, so that the adhesion in the matrix of the fiber-impregnating agent is largely increased. Thus, the fatigue resistance and the wear resistance of the fiber material are exceedingly improved and the durability of various rubber articles such as tires is extremely improved.

When the above-mentioned rubber-reinforcing fiber cord according to the present invention are used in carcass ply cords and/or belt ply cords of a radial tire comprising at least one pair of right and left bead wires, at least one carcass ply cord layer which is turned up and fixed around each of bead wires and has the cords arranged at an angle of 75° to 90° with respect to a tire circumferential direction and at least one belt ply cord layer having the cords arranged at an angle of 0° to 30° relative to the tire circumferential direction, the filaments of the fiber cord are restrained by the matrix of the rubbery material having some flexibility. Thus, even when the cord is bent, the filaments are prevented from being untwisted and undergoing extremely large local bending strain. As a result, when the cords are constituted by the aromatic polyamide fibers, the entire aromatic polyester fibers, or the polyvinyl alcohol fibers having the tenacity of not less than 15 g/d which do not thermally shrink at an ordinary vulcanization temperature (200° C. or less), almost no fatigue fracture of the filaments takes place if the cords are bent. Thus, the heavy duty pneumatic radial tires having excellent running durability can be obtained.

As shown in FIG. 1, according to the present invention, one or more carcass ply cord layers (in this figure, two layers of a first carcass ply cord layer 2 and a second carcass ply cord layer 3) having cords arranged at an angle of 75° to 90° with respect to a tire circumferential direction are arranged, while the opposite end portions of the carcass ply cord layers are turned up and fixed around a pair of bead wires 1 (another bead wire being not shown). One or more belt ply cord layers (in this figure, five layers of a first belt ply cord layer 4, a second belt ply cord layer 5, a third belt ply cord layer 6, a fourth belt ply cord layer 7, and a fifth belt ply cord layer 8) which have belt ply cords arranged at an angle of 0° to 30° with respect to the tire circumferential direction are arranged under a treated rubber 11.

In the thus constituted radial tire, the rubber-reinforcing fiber cords according to the present invention which are made of at least one kind of fibers selected from a group consisting of the aromatic polyamide fibers, the entire aromatic polyester fibers and the polyvinyl alcohol fibers having the tenacity of not less than 15 g/d as the fibers constituting the carcass ply cords and the belt ply cords wherein spaces among the filaments constituting the cords are filled with the rubbery material.

According to the present invention, it is preferable that the spaces among the filaments in both the carcass ply cords and the belt ply cords are impregnated with the impregnating agent. The object of the present invention can be attained even when the spaces among the filaments in either the carcass ply cords or the belt ply cords are impregnated with the impregnating agent. Further, a technique in which a part of the cords of the cord layers are impregnated with the impregnating agent falls in the scope of the present invention.

The present invention will be explained in more detail with respect to the following examples and comparison examples. These examples are given merely as illustration of the invention, but should not be interpreted to limit the scope thereof.

EXAMPLES 1-7 AND COMPARATIVE EXAMPLES 1-2

Treating agent A or B having the following composition was applied to aromatic polyamide fibers (Kevlar) of 1,500 denier/1,000 filaments manufactured by Du pont and entire aromatic polyester fibers of 1,500 denier/500 filaments in a yarn stage. The latter filaments were obtained by melting, liquid crystal-spinning and thermally treating a copolymer of p-hydroxybenzoic acid, and 4,4'-dihydroxydiphenylterephthalic acid. The thus treated yarns were then dried and baked (Examples 1, 2, 3 and 4). Next, two of the 1,500 denier yarns were twisted together (a first twisting 18 turns/10 cm) and three of the thus obtained first twisted cords were twisted together to obtain a cord (a second twisting: 18 turns/10 cm). A treating agent C was applied to the resulting cord, which was baked.

On the other hand, a treated cord was obtained for a comparison purpose. The cord was ordinarily treated with the treating agents A and C after the cord was formed by twisting yarns together without being treated with the treating agent A or B in the yarn stage. The other conditions were the same in the above examples.

In Example 5, a cord as obtained by twisting two Kevlar yarns of 1,500 denier/1,000 filaments together (a first twisting: 18 turns/10 cm), reversely twisting three of thus obtained first twisted cords together (18 turns/10 cm).

The twisted cord was continuously dipped in a treating agent D, and dried at 190° C. for 20 minutes. The weight ratio (impregnating percentage) of R-45 EPI impregnated into the cord was 25%. Next, this cord was continuously dipped into a treating agent C, and thermally treated at 160° C. for 2 minutes and then at 240° C. for 1 minute.

Sections and physical properties of the thus treated cords were shown in Table 1.

In Example 6, a treated cord was prepared by twisting two yarns of 1,500 denier/1,000 filaments of an aramide fibers, Technora (tradename) of Teijin Co., ltd. and following exactly the same procedure as in Example 5.

In Example 7, a treated cord was prepared by dipping-impregnating the aramide fibers, Technora of Teijin Co., Ltd. with a treating Agent E, followed by drying and RFL thermal treatment.

Treating agent A (weight ratio)
 Water : 90.0
 epoxy compound (EX313, manufactured by Nagase Sangyo Co., Ltd.) : 1.9
 JSR 0650 (VP latex) (40%) : 20.0
 dialkylsulfosuccinate (70%) : 0.14
Treating agent B (weight ratio)
 trichloroethane/toluene : 40/35
 4,4'-diphenylmethane diisocyanate : 5
 rubber compound B' : 20
Treating agent C (weight ratio)
 Water 70.0
 resorcinol : 1.5
 formaline (37%) : 1.7
 NaOH (10%) : 1.7
 JSR 0650 (VP latex) (40%) : 25
Treating agent D : (weight ratio)
 R-45EPI *1 : 35
 acetone : 65
Treating agent E (weight ratio)
 R-45EPI *1 : 35
 toluene : 65

Note : *1 R-45EPI is a polybutadiene type liquid polymer having hydroxyl groups at terminals of molecules and epoxy groups inside the molecules, and is a tradename of Idemitsu Ptroleum Chemicals Co., Ltd.

A rubber compound B' used in the treating agent B is given below. The compound kneaded according to the ordinary process is converted to a treating agent B by dissolving it into a solvent of trichloroethane/toluene.
Compound B':
 natural rubber : 70 (PHR)
 SBR : 30 (PHR)
 G.P.F. carbon : 30 (PHR)
 stearic acid : 2.0 (PHR)
 antioxidant (3C) : 1.0 (PHR)
 ZnO : 4.0 (PHR)
 mercaptobenzothiazol : 1.3 (PHR)
 sulfur : 3.0 (PHR)

The treating agent C is used in which NaOH and resorcinol-formaldehyde aqueous solution is cured for 8 hours and JSRO 0650 (VP latex) is mixed into the solution, followed by curing for 20 hours.

The sectional states, the tenacity, the elongation at break, and the adhesion of the thus treated cords were shown in Table 1.

These treated cords were coated with rubber at an end count of 28 cords/5 cm, and tires were built in the order shown in FIGS. 4-7. After belt ply cord layers were attached, radial tires as shown in FIG. 1 were prepared The size of the tires was H46×18-20, while the number of the carcass ply cord layers was two and that of the belt ply cord layers was five. The thus prepared tires were subjected to a drum durable test under the conditions that an internal pressure, a load, and a speed were 13.5 kg/cm$^2$, 20 tons and 15 km/h, respectively. After 3,000 km running, belt ply cords (first belt ply cords and the second belt ply cords only) and the carcass ply cords (the first carcass ply cords and the second ply cords) were taken out from each of the tires, and tenacities thereof were measured. Tenacity retaining percentages (%) were determined with respect to the initial tenacity of each of the treated cords. Results are shown in Table 1.

impregnating agents having a variety of compositions shown in Table 2, and then dried, cords composite bodies were each obtained by twisting three of such treated yarns together. The number of twists was 20 turns/10 cm with respect to both the first and second twistings. In the thus obtained cords, the spaces among the filaments were fully impregnated with the impregnating agent, and the porosity among the filaments was

TABLE 1

| | | Comparative Example 1 | Example 1 | Example 2 | Comparative Example 2 | Example 3 | Example 4 | Example 5 | Example 6 | Example 7 |
|---|---|---|---|---|---|---|---|---|---|---|
| Yarn | kind of fibers | Kelvar | Kelvar | Kelvar | (EAPF*2) | (EAPF*2) | (EAPF*2) | Kelvar | Technora | Technora |
| | treating agent A | — | treated | — | — | treated | — | — | — | — |
| | treating agent B | — | — | treated | — | — | treated | — | — | — |
| Cord | treating agent A | treated | — | — | treated | — | — | — | — | — |
| | treating agent B | — | — | — | — | — | — | — | — | — |
| | treating agent C | treated | treated | treated | treated | treated | treated | treated | treated | treated |
| | treating agent D | — | — | — | — | — | — | treated | treated | — |
| | treating agent E | — | — | — | — | — | — | — | — | treated |
| Properties of treated cord | Cord sectional state | FIG. 3 | FIG. 2 | FIG. 2 | FIG. 3 | FIG. 2 | FIG. 2 | FIG. 2 | FIG. 2 | FIG. 2 |
| | tenacity (kg/cord) | 170 | 165 | 165 | 180 | 173 | 168 | 168 | 175 | 175 |
| | elongation at break (%) | 5.5 | 6.3 | 6.4 | 5.0 | 5.5 | 5.6 | 6.5 | 7.0 | 7.0 |
| | adhesion*1 (kg/inch) | 25 | 24 | 26 | 28 | 28 | 28 | 25 | 28 | 28 |
| Residual tenacity after running on drum | tenacity of first belt ply cord (kg/cord) | 142 (84)*3 | 160 (97) | 162 (98) | 132 (73) | 170 (98) | 171 (99) | 165 (98) | 170 (97) | 172 (98) |
| | tenacity of second belt ply cord (kg/cord) | 150 (88) | 160 (97) | 161 (98) | 141 (78) | 169 (98) | 170 (98) | 163 (97) | 168 (96) | 170 (97) |
| | tenacity of first belt ply cord (kg/cord) | 75 (44) | 165 (100) | 163 (99) | 62 (34) | 173 (100) | 170 (98) | 166 (99) | 175 (100) | 173 (99) |
| | tenacity of second carcass ply cord (kg/cord) | 168 (99) | 163 (99) | 163 (99) | 175 (97) | 172 (99) | 172 (99) | 168 (100) | 173 (99) | 175 (100) |

*1EAPF is an abbreviation of entire aromatic polyeser fibers
*2An adhesive force was measured as a peeling resistance per one inch width of a test piece in a peeling test. In the test, the testpiece was made by bonding two rubber-topped layers and vulcanizing the thus obtained laminate, and the two layers were then peeled.
*3Parenthesized values show tenacity retaining percentages (%) for those of the treated fresh cords.

As obvious from the above results, in Examples 1, 2, 3, 4, 5, 6 and 7, spaces among the filaments constituting the cords are filled with the rubbery material of the treating agent A or B, and the cord section exhibits a sea-island type matrix structure as shown in FIG. 2 in which the filaments form island sections and the rubbery material forms sea sections. The tenacity retaining percentages after the drum running test are as high as not less than 98% and the running durability was excellent, too. To the contrary, in Comparative Examples 1 and 2, as shown in FIG. 3, the rubbery material is impregnated only into the outer peripheral portion of the cord and the sea-island type matrix structure is not formed. Thus, the cord tenacity retaining percentages after the drum running test are low. Particularly, the cord tenacity retaining percentages of the first carcass ply cords were lowered below 50%.

EXAMPLES 8-17

After polyparaphenylene terephthalamide fiber yarns of 3,000 denier/1,333 filaments were immersed into 0 to 10%.

A tire having a tire size of H 46×18-20 as shown in FIG. 1 was prepared by using the cords impregnated with the impregnating agent as carcass ply cords and belt ply cords, and performance thereof was evaluated according to the following evaluation methods. Results are shown in Table 3.

(1) Long run durability:

A tire was subjected to a drum running durability test under conditions of an internal pressure: 13.5 kg/cm², a load: 20 tons and a speed: 15 km/hr. After 3,000 km running, first carcass ply cords were taken out from the tire, and the tenacity thereof was measured. A tenacity retaining percentage was calculated by dividing the thus measured value by a cord tenacity before the testing, and employed as a scale for showing the fatigue of the cords.

The length of a crack in a longitudinal direction of the cords in an end portion of the second carcass ply cord layer was also measured. The higher the tenacity retaining percentage and the shorter the length of the crack, the more excellent the long run durability.

(2) High speed durability:

A speed was raised stepwise by 20 km/hr per 5 minutes at an internal pressure of 13.5 kg/cm$^2$ and a load of 20 tons until a separation occurred. The speed at which the separation occurred was determined as a scale indicating a high speed durability. The larger this value, the more excellent the high speed durability.

TABLE 2

| Example No. | Composition of impregnating agent | part by weight |
|---|---|---|
| 8 | vinylpyridine-styrene-butadiene latex | 100 |
| | diglycerol triglycidyl ether | 10 |
| | Sulfur | 2 |
| | dibenzothiazyl sulfide | 1.5 |
| 9 | styrene-butadiene latex | 100 |
| | glycerol diglycidyl ether | 15 |
| | sulfur | 2 |
| | dibenzothiazyl sulfide | 1.5 |
| 10 | acrylonitrile-butadiene latex | 100 |
| | diglycerol triglycidyl ether | 10 |
| | sulfer | 2 |
| | benzothiazyl sulfide | 1.5 |
| 11 | vinylpyridine-styrene-butadiene latex | 100 |
| | ε-caprolactam reaction product of diphenylmethane-4,4'-diisocyanate | 10 |
| | sulfur | 2 |
| | dibenzothiazyl disulfide | 1.5 |
| 12 | vinylpyridine-styrene-butadiene latex | 100 |
| | phenol reaction product of tolylenediisocyanate | 10 |
| | sulfur | 2 |
| | dibenzothiazyl disulfide | 1.5 |
| 13 | vinylpyridine-styrene-butadiene latex | 100 |
| | sorbitol polyglycidyl ether (manufactured by Nagas Kasei Kabushiki Kaisha, Ex 611) | 5 |
| | sulfur | 3 |
| 14 | vinylpyridine-styrene-butadiene latex | 100 |
| | polyethylene glycol polyglycidyl ether | 10 |
| | Sulfur | 2 |
| | N-oxydiethylene-2-benzothiazol sulfenamide | 2 |
| 15 | vinylpyridine-styrene-butadiene latex | 100 |
| | diglycerol triglycidyl ether | 15 |
| | sulfur | 3 |
| | sodium diethyldithiocarbamate | 1 |
| 16 | styrene-butadiene latex | 100 |
| | diglycerol triglycidyl ether | 20 |
| | resorcinol-formaldehyde resin | 15 |
| 17 | styrene-butadiene latex | 100 |
| | diglycerol triglycidyl ether | 10 |
| | t-butylcumyl proxide | 2 |

TABLE 3

| | | Long run durability | |
|---|---|---|---|
| Example No. | High speed durability (km/hr) | length of crack (mm) | cord fatigue resistance (tenacity retaining percentage) (%) |
| 8 | 340 | 6 | 95 |
| 9 | 340 | 8 | 94 |
| 10 | 340 | 7 | 96 |
| 11 | 330 | 7 | 95 |
| 12 | 340 | 5 | 93 |
| 13 | 330 | 6 | 92 |
| 14 | 330 | 9 | 98 |
| 15 | 340 | 8 | 94 |
| 16 | 340 | 5 | 92 |
| 17 | 340 | 6 | 91 |

EXAMPLES 18-29

A copolymer consisting of p-hydroxybenzoic acid, 4,4'-dihydroxydiphenyl and terephthalic acid as monomer units was melted, liquid crystal-spun, and then thermally treated. The thus obtained entire aromatic polyester fibers of 1,500 denier/500 filaments and an impregnating agent having a composition shown in Table 4 were used, and cords and tires were prepared under the same conditions as in Example 8. Performance thereof was evaluated and results are shown in Table 5.

TABLE 4

| Example No. | Composition of impregnating agent | part by weight |
|---|---|---|
| 18 | vinylpyridine-styrene-butadiene latex | 100 |
| | diglycerol triglycidyl ether | 10 |
| | sulfur | 2 |
| | dibenzothiazyl disulfide | 1.5 |
| 19 | styrene-butadiene rubber | 100 |
| | tolylenediisocyanate | 10 |
| 20 | natural rubber | 100 |
| | tolylenediisocyanate | 10 |
| 21 | acrylonitrile-butadiene rubber | 100 |
| | tolylenediisocyanate | 10 |
| 22 | styrene-butadiene rubber | 100 |
| | diglycerol triglycidyl ether | 20 |
| 23 | styrene-butadiene rubber | 100 |
| | triphenylmethane triisocyanate | 10 |
| 24 | styrene-butadiene rubber | 100 |
| | resorcinol-formaldehyde resin | 20 |
| 25 | styrene-butadiene rubber | 100 |
| | bismaleimide triadine resin (manufactured by Mitsubishi Gas Co., ltd., BT 2420) | 25 |
| 26 | epoxidized butadiene rubber (epoxidization percentage of 5% in which double bonds of butadiene rubber are poxidized with peracetic acid) | 100 |
| | diphenylmethane-4,4-diisocyanate | 10 |
| 27 | acrylic butadiene rubber (acrylic percentage of 10% in which double bonds of butadiene are converted to acrylic bonds with methylmethacrylate) | 100 |
| | diphenylmethane-4,4-diisocyanate | 10 |
| 28 | chlorinated butadiene rubber (chlorination percentage of 15% in which double bonds of butadiene rubber are chlorinated with chlorine) | 100 |
| | diphenylmethane-4,4-diisocyanate | 10 |
| 29 | epoxidized styrene-butadiene rubber (epoxidization percentage of 8% in which double bonds of styrene-butadiene rubber are epoxidized with peracetic acid) | 100 |
| | diphenylmethane-4,4'-diisocyanate | 10 |

TABLE 5

| | | Long run durability | |
|---|---|---|---|
| Example No. | High speed durability (km/hr) | length of crack (mm) | cord fatigue resistance (tenacity retaining percentage) (%) |
| 18 | 340 | 7 | 90 |
| 19 | 340 | 5 | 93 |
| 20 | 340 | 8 | 91 |
| 21 | 340 | 9 | 90 |
| 22 | 340 | 7 | 92 |
| 23 | 340 | 6 | 93 |
| 24 | 330 | 8 | 90 |
| 25 | 330 | 7 | 93 |
| 26 | 340 | 9 | 91 |
| 27 | 340 | 8 | 95 |
| 28 | 340 | 7 | 93 |
| 29 | 340 | 8 | 96 |

According to the specific examples of the rubber-reinforcing cords of the present invention, the heavy duty pneumatic radial tires which can attain a weight reduction and maintain a high internal pressure and are excellent in the durability can be obtained even when the high tenacity and high modulus fibers such as aromatic polyamide fibers.

In addition, although the conventional rubber reinforcing cords need a two bath adhesive treatment, the rubber-reinforcing fiber cords according to the present invention can be treated with the impregnating agent only in one bath. Thus, the present invention largely contributes to reduction of cost in the tire production.

Furthermore, the above examples of the rubber-reinforcing fiber cords according to the present invention do not necessarily need heating in the bonding treatment, and the impregnating agent is cured through reaction during the vulcanization of the tire. Thus, energy saving recently required in the manufacture of the tires can be attained.

EXAMPLES 30-35

Kevlar 29 (1,500 denier/1,000 filaments) manufactured by Du Pont and an entire aromatic polyester (1,500 denier/500 filaments) were used as cord material. The latter was obtained by melting, liquid crystal-spinning and then thermally treating a copolymer consisting of p-hydroxybenzoic acid, 4,4'-dihydroxydiphenyl, and terephthalic acid as monomer units. As a treating agent, two kinds of treating agents A and B having compounding ratio shown in Table 6 were used. The treating agent B was cured to an appropriate degree.

TABLE 6

| Treating Agent A | | Treating Agent B | |
| --- | --- | --- | --- |
| epoxy (EX 313) | 0.95 | water | 70.1 |
| VP-Latex (40%) | 15.0 | resorcinol | 1.5 |
| SBR-Latex (40%) | 5.0 | formalin (37%) | 1.7 |
| dialkylsulfosuccinate (70%) | 0.10 | NaOH (10%) | 1.7 |
| Water | 78.95 | VP-Latex (40%) | 19 |
| | | SBR-Latex (40%) | 6 |

After the above two kinds of the fibers were converted to cords from respective yarns (multifilaments), the cords were treated with the treating agents A and B, and dried and baked (resinified) under conditions shown in Table 7 to obtain cord Nos. 1 and 4.

Cord Nos. 2 and 5 were obtained as follows:

Respective fibers in the yarn state were treated with the treating agent A, dried and baked under the conditions shown in Table 7. Then, twisted cords were formed, and treated with the treating agent B, followed by drying and baking under similar conditions.

Cord Nos. 3 and 6 were obtained as follows:

Respective fibers in a yarn state were treated with the treating agent A, and only dried under conditions shown in Table 7. Then, twisted cords were formed, and treated with the treating agent B, followed by drying only under the same conditions.

The thus obtained cord Nos. 1-6 were subjected to tests shown in Table 7.

The sectional states of the cords in Table 7 were examined through observation of the cord matrix states by means of an electromicroscope (SEM) after treatment with the impregnating agent, and by I type of FIG. 2 and II type of FIG. 3.

Solubility is shown to examine the baking degree (resinified degree) of the impregnating agent. A twisted test cord having 1 cm long was put into a solvent of trichoroethane/toluene (1:1 by weight ratio) and boiled for 2 hours.

As to an adhesion, a peeling resistive force (per one inch width) of a test piece was measured in parallel with cords thereof. The test piece was prepared by preparing cord plies each having an end count of 25 cords/5 cm, rubber-topping the cord plies, and bonding the two cord plies thus obtained.

Results are shown in Table 7.

TABLE 7

| Example No. | 30 | 31 | 32 | 33 | 34 | 35 |
| --- | --- | --- | --- | --- | --- | --- |
| Cord No. | 1 | 2 | 3 | 4 | 5 | 6 |
| Cord material | Kevlar | Kevlar | Kevlar | entire aromatic polyester | entire aromatic polyester | entire aromatic polyester |
| Denier | 1500 | 1500 | 1500 | 1500 | 1500 | 1500 |
| Number of filaments | 1000 | 1000 | 1000 | 500 | 500 | 500 |
| Yarn stage treating agent A | — | treated | treated | — | treated | treated |
| dried at 120° C. for 120 seconds | — | dried | dried | — | dried | dried |
| baked at 200° C. for 60 seconds | — | baked | — | — | baked | — |
| Twisting construction | 1500 × 3 | 1500 × 3 | 1500 × 3 | 1500 × 3 | 1500 × 3 | 1500 × 3 |
| Number of twist | 18 × 18 | 18 × 18 | 18 × 18 | 18 × 18 | 18 × 18 | 18 × 18 |
| Cord stage treating agent A | treated | — | — | treated | — | — |
| dried at 120° C. for 120 seconds | dried | — | — | dried | — | — |
| baked at 200° C. for 60 seconds | baked | — | — | baked | — | — |
| treating agent B | treated | treated | treated | treated | treated | treated |
| dried at 120° C. for 120 seconds | dried | dried | dried | dried | dried | dried |
| baked at 200° C. for 60 seconds | baked | baked | — | baked | baked | — |
| Cord sectional state | II | I | I | II | I | I |
| Solubility | insoluble | insoluble | dissolved *1 | insoluble | insoluble | dissolved *1 |
| Tenacity (kg/cord) | 170 | 162 | 162 | 182 | 173 | 173 |
| Elongation at break (%) | 7.0 | 7.8 | 7.8 | 6.2 | 7.1 | 7.2 |
| Adhesion (kg/in) | 23 | 24 | 23 | 25 | 25 | 24 |

*1 It was confirmed that the cord was broken to filaments.

EXAMPLES 36 to 41

Aircraft radial tires having a tire size of H46×18-20 were experimentally prepared by using the treated cords shown in Table 7. An outline of the structure of the tires is shown in FIG. 1. Two carcass ply cord layers were used, and their cords were arranged in parallel with the radial direction at an end count of 28 cords/5 cm at the bead portion. Five belt ply cords were used, and their cords are arranged in parallel with a tire circumferential direction. A single cord was spirally wound from one end to the other thereof at an end count of 23 cords/5 cm to form the belt ply cords.

With respect to the test tires when in a fresh state and after running on a drum, tenacity and elongation at break (%) were measured for cords in first and second belt ply cord layers 11-1 and 11-2 and first and second carcass ply cord layers 12-1 and 12-2.

A tire drum durability test was effected under conditions of an internal pressure: 13.5 kg/cm², a load: 20 t and a speed: 15 km/h. After 3,000 km running, cords were taken out from the first and second belt ply cord layers 11-1 and 11-2 and the first and second carcass ply cord layers 12-1 and 12-2 of the test tire, and physical properties of the cords were measured. With respect to the carcass ply cord layers, the physical properties of the cords at the shoulder portion were measured.

Obtained results are shown in Table 8.

The performances of the thus prepared tires were evaluated according to the following evaluation methods, and results are shown in Table 9.

Evaluation Methods (1) High speed durability:

TABLE 8

| Example No. | | | 36 | 37 | 38 | 39 | 40 | 41 |
|---|---|---|---|---|---|---|---|---|
| Kind of belt cords *1 | | | No. 1 | no. 2 | No. 3 | No. 4 | No. 5 | No. 6 |
| Kind of carcass cords *1 | | | No. 1 | No. 2 | No. 3 | No. 4 | No. 5 | No. 6 |
| Fresh tire | belt cord layer | 1st tenacity (kg/cord) | 163 *2 (96) | 143 (88) | 161 (99) | 180 (99) | 151 (87) | 167 (97) |
| | | elongation at break (%) | 7.0 | 5.7 | 7.5 | 6.1 | 5.0 | 6.8 |
| | | 2nd tenacity (kg/cord) | 161 (95) | 148 (91) | 160 (99) | 178 (88) | 150 (87) | 168 (97) |
| | | elongation at break (%) | 7.1 | 6.0 | 7.4 | 6.0 | 5.1 | 6.7 |
| | carcass cord layer | 1st tenacity (kg/cord) | 165 (97) | 145 (90) | 162 (100) | 181 (99) | 153 (88) | 167 (97) |
| | | elongation at break (%) | 6.7 | 5.8 | 7.5 | 6.1 | 5.2 | 6.6 |
| | | 2nd tenacity (kg/cord) | 167 (98) | 150 (93) | 162 (100) | 180 (99) | 149 (86) | 165 (95) |
| | | elongation at break (%) | 6.8 | 6.2 | 7.5 | 6.0 | 5.0 | 6.6 |
| Tire after running on drum | belt cord layer | 1st tenacity (kg/cord) | 142 *3 (87) | 140 (98) | 159 (99) | 141 (78) | 148 (98) | 165 (99) |
| | | elongation at break (%) | 5.7 | 5.5 | 7.4 | 5.0 | 4.9 | 6.5 |
| | | 2nd tenacity (kg/cord) | 145 (90) | 145 (98) | 156 (98) | 136 (76) | 148 (99) | 166 (99) |
| | | elongation at break (%) | 5.6 | 5.7 | 7.3 | 4.7 | 5.0 | 6.4 |
| | carcass cord layer | 1st tenacity (kg/cord) | 71 (43) | 143 (99) | 157 (97) | 65 (36) | 150 (98) | 161 (96) |
| | | elongation at break (%) | 5.0 | 5.7 | 7.1 | 3.0 | 5.0 | 6.2 |
| | | 2nd tenacity (kg/cord) | 142 (85) | 148 (99) | 155 (96) | 152 (84) | 145 (97) | 167 (101) |
| | | elongation at break (%) | 5.8 | 6.0 | 7.1 | 5.1 | 4.7 | 6.7 |

*1 Corresponding to the number in the treated cords of Table 7.
*2 Parenthesized figures denote tenacity retaining percentages in the treated cords of Table 7.
*3 Parenthesized figures denote tenacity retaining percentages in comparison with the tenacities in fresh tires

EXAMPLE 42

A yarn of 3,000 d/1,333 filaments of polyparaphenylene terephthalamide was passed through an apparatus which could perform differential evacuation and was equipped with a microwave generator and a plasma treating chamber for using plasma generated from the microwave generator. While the yarn was continuously moved in the apparatus, a pressure in the plasma treating zone was adjusted to 0.1 Torr or less by means of a differential evacuating pump, and then $O_2$ gas was introduced into the plasma treating zone in this state through an inlet opening to adjust the pressure thereof to 1 Torr. In that state, gas plasma of an output of 1 kw was generated at a frequency of 2.45 GHz from the microwave generator. Movement of the yarn was controlled such that the yarn passed through the plasma generating zone in 20 seconds to 120 seconds, thereby effecting the plasma treatment.

Next, the yarn was immersed into an impregnating agent having the following composition, and then dried. Three such yarns were twisted together to form a cord composite body. In this case, the first twisting and the second twisting were both 20 turns/10 cm.

| Compounding ingredient | Compounding amount (part by weight) |
|---|---|
| vinylpyridine-styrene-butadiene latex | 100 |
| diglycerol triglycidyl ether | 10 |
| sulfur | 2 |
| dibenzothiazyldisulfide | 1.5 |

The above composition was dissolved or dispersed in water.

Each of the substantially whole filaments were covered with the impregnating agent.

Tires having a tire size of H46×18-20 were experimentally prepared by using the above cord composite bodies in belt cords and carcass cords.

A speed was raised by 20 km/h every five minutes under a constant internal pressure of 13.5 kg/cm$^2$ (normal internal pressure) and a constant normal load of 20 ton, and a test was continued until a test tire was broken. A speed causing the breakage was taken as a durability level.

(2) Initial stage adhesion:

An initial stage adhesion was shown by an peeling resistance between carcass cord layers 2-1 and 2-2 at a shoulder portion of a fresh tire.

(3) Adhesion fatigue property and cord fatigue property:

A tire was continuously run at a speed of 20 km/h under a constant normal load of 20 tons and stopped after 6,000 km running. Then, cords were taken out from the tire, and an adhesion fatigue resistance and a cord fatigue resistance were shown by an adhesion retaining percentage and a tenacity retaining percentage in comparison with a fresh tire.

EXAMPLE 43

A copolymer consisting of p-hydroxybenzoic acid, 4,4'-dihydroxydiphenyl, and terephthalic acid as monomer units instead of polyparaphenylene terephthalamide in Example 42 was melt, liquid crystal-spun, and then thermally treated. A cord composite body was prepared in the same manner as in Example 42 except that yarns (1,500 d/500 filaments) of the thus obtained entire aromatic polyester were used. A tire having the same tire size as in Example 42 was experimentally prepared by using such cord composite bodies. Tire performance was evaluated by the above evaluation methods, and results are also shown in Table 9.

EXAMPLE 44

A tire having the same tire size as in Example 42 was experimentally prepared by using cord composite bodies made by the same method as in Example 42 except that $N_2$ gas was used instead of the plasma gas $O_2$ in Example 42. Tire performance was evaluated by the above evaluation methods, and results are also shown in Table 9.

EXAMPLE 45

A tire having the same tire size as in Example 42 was experimentally prepared by using cord composite bodies formed by the same method as in Example 42 except that the impregnating agent in Example 42 was replaced by that having the following composition. Tire performances was evaluated by the above-mentioned evaluation methods, and results are also shown in Table 9.

| Compounding ingredient | Compounding amount (part by weight) |
|---|---|
| vinylpyridine-styrene-butadiene latex | 100 |
| ε-caprolactam reaction product of diphenylmethane 4,4'-diisocyanate | 10 |
| sulfur | 2 |
| dibenzothiazyldisulfide | 1.5 |

The above composition was dissolved or dispersed in water.

EXAMPLE 46

A tire having the same tire size as in Example 42 was experimentally prepared by using cord composite bodies formed by the same method as in Example 42 except that the impregnating agent in Example 42 was replaced by that having the following composition. Tire performance was evaluated by the above-mentioned evaluation methods, and results are shown in Table 9.

| Compounding ingredient | Compounding amount (part by weight) |
|---|---|
| styrene-butadiene rubber | 100 |
| tolylene diisocyanate | 10 |

The above composition was dissolved in a rubber solvent.

EXAMPLE 47

A tire having the same tire size as in Example 42 was experimentally prepared by using cord composite bodies formed by the same method as in Example 42 except that the impregnating agent in Example 42 was replaced by that having the following composition. Tire performance was evaluated by the above-mentioned evaluation methods, and results are shown in Table 9.

| Compounding ingredient | Compounding amount (part by weight) |
|---|---|
| epoxidized butadiene rubber | 100 |
| diphenylmethane-4,4'-diisocyanate | 10 |

The above composition was dissolved into a rubber solvent.

The epoxidized butadiene is butadiene in which 5% of the total double bonds are epoxidized by expoxidizing the butadiene with peracetic acid.

COMPARATIVE EXAMPLE 3

3,000 d yarns of polyparaphenylene terephthalamide were first twisted at 20 turns/10 cm. Three bundles of such first twisted yarns were twisted together, and then second twisting was effected at 20 turns/10 cm. A resulting cord was immersed into a liquid having the following composition and thermally treated at 240° C. for 60 minutes.

| Compounding ingredient | Compounding amount (part by weight) |
|---|---|
| glyceroldiglycidyl ether | 20 |
| A.6 (70%)* | 1.5 |
| caustic soda (10% aqueous solution) | 10 |
| water | 68.5 |

Note: *Sodium dioctyl sulfosuccinate (70% aqueous solution)

The cord was further immersed in a liquid having the following composition, and thermally treated at 240° C. for 60 seconds, thereby obtaining the cord having undergone bonding treatment.

| Compounding ingredient | Compounding amount (part by weight) |
|---|---|
| resorcinol | 19 |
| formaldehyde (37%) | 24 |
| caustic soda (10% aqueous solution) | 17 |
| vinylpyridine-styrene-butadiene latex (41%) | 420 |
| water | 520 |

A tire having the same tire size as in Example 42 was experimentally prepared by using the above cords. Tire performance was evaluated by the above-mentioned evaluation methods, and results are shown in Table 9.

TABLE 9

| | Example 42 | Example 43 | Example 44 | Example 45 | Example 46 | Example 47 | Comparative example 3 |
|---|---|---|---|---|---|---|---|
| High speed durability (km/h) | 360 | 350 | 360 | 350 | 350 | 360 | 300 |
| Adhesion initial stage (kg/IN) | 32 | 33 | 30 | 33 | 31 | 32 | 27 |
| retaining percentage after fatigue test (%) | 86 | 84 | 83 | 87 | 85 | 85 | 56 |
| Cord fatigue resistance retaining percentage (%) | 95 | 95 | 96 | 95 | 93 | 91 | 30 |

EXAMPLES 48 to 51 AND COMPARATIVE EXAMPLE 4

Aramide fiber cords (3,000D/3, number of twist: 20×20 turns/10 cm) made of aramide fibers (manufactured by Du Pont, tradename: Kevlar) was immersed in a liquid polybutadiene rubber having a molecular weight shown in Table 12 for 8 hours, while the impregnating agent was kept at 80° C. Then, after the impregnating agent on the surface of the cord was removed, an RFL adhesive shown in Table 10 was attached to the surface of the cord, followed by heating at 160° C. for 1 minutes and then at 250° C. for 2 minutes, thereby drying the adhesive and effecting the adhesion reaction. In both the treatment, no solvent was used in the impregnating agent.

Next, test samples were prepared according to a reference standard 3.2.1: A-method in JIS L 1017-1983 by using the thus obtained rubber-reinforcing fiber cords and a cord-buring rubber composition shown in Table 11, and a fatigue test was effected (pulley diameter: 80 mm, and cord end count: 16 cords/inch). Obtained results are also shown in Table 12.

TABLE 10

| RFL adhesive | (part by weight) |
| --- | --- |
| soft water | 597 |
| resorcinol | 18.20 |
| 37% formaldehyde aqueous solution | 26.90 |
| 10% caustic soda aqueous solution | 6.60 |
| vinylpyridine rubber latex (40%)* | 351.3 |

*Styrene-butadiene-vinylpyridine latex (manufactured by Japan synthetic rubber Co., Ltd., JSR 0650)

TABLE 11

| Cord-burying rubber composition | (part by weight) |
| --- | --- |
| natural rubber | 100 |
| zinc oxide | 5 |
| stearic acid | 2 |
| antioxidant | 1 |
| softener | 5 |
| carbon black (HAF) | 45 |
| sulfur | 2.5 |
| vulcanization accelerator (MOR) | 0.8 |

TABLE 12

| Molecular weight of liquid rubber and test results | | | | | |
| --- | --- | --- | --- | --- | --- |
| | Example 48 | Example 49 | Example 50 | Example 51 | Comparative Example 4 |
| number average molecular weight of liquid rubber | 800 | 3500 | 25000 | 50000 | — |
| cord tenacity retaining percentage (%) after compression bending at 200,000 times | 74 | 99 | 94 | 81 | 71 |

It was understood from the test results shown in Table 12 that Comparative Example 4 which has directly undergone the RFL bonding treatment without being impregnated with the liquid rubber was the worst in the fatigue resistance.

EXAMPLES 52 AND 53

In order to examine differences in effects between different liquids rubbers, the same test as in Example 49 was effected by using liquid polybutadiene rubber having hydroxyl groups (manufactured by Idemitsu Petroleum Chemical Co., Ltd., tradename: R-45HT) and liquid polyisoprene rubber having carboxyl groups (manufactured by Kuraray Co., Ltd., tradename: LIR-403).

TABLE 13

| | Example 53 | Example 54 |
| --- | --- | --- |
| Kind of liquid rubber | liquid polybutadiene having hydroxy groups | liquid polyisoprene rubber having carboxyl groups |
| Cord tenacity retaining percentage (%) after bending fatigue at 200,000 times | 99 | 98 |

As shown in Table 13, excellent fatigue resistance could be obtained even in the use of any one of the liquid polybutadiene polymer having the hydroxyl groups at the terminals of the molecules and the liquid polyisoprene polymer having the carboxyl groups at the terminals of the molecules.

As having been explained in the foregoing, the rubber-reinforcing fiber cord according to the present invention offers an effect that the fatigue resistance can be improved without the tenacity and the elasticity of the cord being reduced by impregnating the cord with the impregnating agent composed of a rubbery material such as a specific liquid rubber as an essential ingredient.

According to the present invention, heavy duty radial tires with reduced weight, high pressure maintenance and excellent running durability can be obtained by improving the bending fatigue resistance of the high tenacity and high elasticity fibers such as aromatic polyamide fibers and the radial tires according to the present invention are extremely useful for the aircraft tires and tires for high speed trains and as liner tires used in motor cars.

What is claimed is:

1. A heavy duty pneumatic radial tire comprising at least one pair of bead wires on the right and left, at least one carcass ply cord layer which is turned up and fixed around each of at least one of the bead wires and has cords arranged at an angle of 75° to 90° with respect to a tire circumferential direction, and at least one belt ply cord layer having cords arranged at an angle of 0° to 30° with respect to the tire circumference direction, wherein at least either one of twisted cords constituting the carcass cord ply layer and twisted cords constituting the belt cord ply layer are each formed by first obtaining a cord through twisting together a plurality of yarns made of at least one kind of fibers selected from the group consisting of aromatic polyamide fibers, entire aromatic polyester fibers and polyvinyl alcohol fibers having a tenacity of not less than 15 g/d or through first twisting yarns to form a cable twist and then twisting a plurality of thus obtained cable twists; secondly immersing the resulting cord into an impregnating agent consisting essentially of a liquid rubber having a number average molecular weight of 1,000 to 60,000 and finally bonding the cord with an adhesive of a resorcinol-formaldehyde-latex under heating, said liquid rubber being selected from the group of polymers consisting of polybutadiene rubber, polyisoprene rubber, styrene-butadiene rubber, and acrylonitrilebutadiene rubber, terminals of molecular chains of the polymers of the liquid rubber or inner portions of the molecular chains having activating functional groups selected from the group consisting of carboxyl groups, epoxy groups, acrylonitril groups, and isocyanate groups.

2. A heavy duty pneumatic radial tire according to claim 1, wherein said liquid rubber is a polybutadiene polymer having hydroxyl groups at terminals of molecular chains thereof.

3. A heavy duty pneumatic radial tire according to claim 2, wherein said liquid rubber is the polybutadiene polymer having epoxy groups in molecular chains thereof.

4. A heavy duty pneumatic radial tire according to claim 1, wherein the liquid rubber is a polyisoprene polymer having carboxyl groups at terminals of molecular chains thereof.

* * * * *